Patented Jan. 1, 1946

2,392,105

UNITED STATES PATENT OFFICE 2,392,105

AMINATION OF AMINE-SACCHARIDE RESINS

Sidney Sussman, Moorestown, N. J., assignor to The Permutit Company, New York, N. Y., a corporation of Delaware No Drawing. Application April 2, 1942, Serial No. 437,357

14 Claims. (Cl. 210—24)

This invention relates to a method for the improvement of certain resins useful for the exchange of anions in solutions or for the absorption of acids from solutions, to the resins thus produced, and to the removal of acids from liquids by means of such resins.

The condensation of certain aromatic amines with saccharides, or with substances which yield saccharides upon hydrolysis, in order to produce resins, has been described by E. L. Holmes in U. S. Patent #2,198,874. The resins produced by this reaction are valued for their chemical properties, rather than their physical properties, in that they are capable of absorbing acids from solutions and of exchanging anions in solutions.

One object of the present invention is to increase substantially the acid removal capacity of the anion exchange aromatic amine-saccharide resins.

Another object of this invention is the improvement of the acid removal capacity of certain other inexpensive amine-saccharide resins, heretofore considered to have too small an acid removal capacity for practical use, in order to make these of practical interest.

A further object is the provision of aminated amine-saccharide resins having improved abilities for anion absorption or anion exchange reactions.

Other objects of this invention will be apparent from the specification which follows.

I have found that resins having an increased capacity for the removal of acids from solutions can be prepared by aminating various aromatic amine-saccharide resins. Resins with good capacities can thus be produced from materials that initially had insufficient capacity to be of practical value, and the capacities of even the better materials can be substantially increased.

Essentially, the aminating procedure consists of reacting an anion exchanging amine-saccharide resin with a reagent or reagents that produce amination of the resin. The resins treated may be of the kind described in Holmes Patent #2,198,874 prepared by reacting a phenylene diamine with a saccharide or a substance that produces a saccharide upon hydrolysis, or various other resins prepared from other aromatic amines may be used. The amination treatment may be carried out in various ways such as treating the resin with liquid ammonia and zinc chloride. Ammonia in other forms or various amines may be used, and other catalysts such as various metallic halides may be used instead of zinc chloride.

In order to illustrate the invention so that it will be understood more clearly, the following examples of the preparation of aminated resins are given.

Example 1.—Following the method of Holmes, a resin was produced by dissolving 13.6 parts by weight of metaphenylene diamine in 240 parts of water and 11.9 parts of concentrated hydrochloric acid. Thirty-five parts of glucose were added and the solution was boiled for one and one-third hours and then cooled. The resulting resin gel was dried at 70° C. After breaking up to pass a 10 mesh screen, the resin was regenerated with 14% ammonia solution and was washed free of excess regenerant. This resin removed 0.54 milliequivalent of chloride ion per gram from a hydrochloric acid solution whose final chloride ion concentration was 7.5 milliequivalents per liter, and 1.30 milliequivalents of chloride ion per gram from a hydrochloric acid solution whose final chloride ion concentration was 25.0 milliequivalents per liter.

In order to obtain directly comparable values for acid removal capacity, test results, such as these, must be extrapolated to some standard final chloride ion concentration. Making use of the Freundlich adsorption isotherm, these values are plotted on logarithmic graph paper and extrapolated to a final chloride ion concentration of 4 milliequivalents per liter. At the comparison concentration, the above resin removed 0.33 milliequivalent of chloride ion per gram.

Twenty parts of the above (unregenerated) resin were mixed intimately with 10 parts of anhydrous zinc chloride and the mixture was placed in an autoclave, together with about 22 parts of liquid ammonia. The sealed autoclave was heated at 90° C. for 24 hours. After opening the autoclave, the excess ammonia was allowed to evaporate. The resin was then washed with water, dilute hydrochloric acid, and, again, water. After regeneration with 14% ammonia solution and washing free from excess regenerant, this resin removed 0.79 milliequivalent of chloride ion per gram from a hydrochloric acid solution whose final chloride ion concentration was 6.8 milliequivalents per liter, and 1.87 milliequivalents per gram from a hydrochloric acid solution whose final chloride ion concentration was 25.0 milliequivalents per liter. At the comparison concentration of 4 milliequivalents per liter final chloride ion concentration, this resin removed 0.55 milliequivalent of chloride ion per gram. Thus, the aminated product had a 67% higher capacity than did the original resin.

*Example II.*—Twenty parts of the same untreated metaphenylene diamine-glucose resin were mixed intimately with 18 parts of anhydrous zinc chloride and the mixture was placed in an autoclave, together with about 22 parts of liquid ammonia. The sealed autoclave was heated at 90° C. for 24 hours. After opening the autoclave and permitting the excess ammonia to evaporate, the resin was washed with water, dilute hydrochloric acid, and, again, water. After regeneration with 14% ammonia solution and washing free from excess regenerant this aminated resin removed 1.18 milliequivalents of chloride ion per gram from a hydrochloric acid solution whose final chloride ion concentration was 7.5 milliequivalents per liter, and 2.6 milliequivalents of chloride ion per gram from a hydrochloric acid solution whose final chloride ion concentration was 27.0 milliequivalents per liter. The capacity at the comparison concentration of 4 milliequivalents per liter was 0.79 milliequivalent of chloride ion per gram. The improved product had a capacity 139% higher than that of the original resin.

It seems likely that the mechanism whereby this increase in acid removal capacity is brought about involves the replacement of hydroxyl groups on the saccharide portion of the resin molecules by amino groups. In this way, groups having no basic properties are replaced by basic groups. Support for this theory of mechanism is offered by the fact that the nitrogen content of the metaphenylene diamine-glucose resin used as a starting material in the preceding examples was raised from 9.0% to 11.9% by the process described in Example I and to 16.2% by the process described in Example II. However, I do not wish to be limited by this theory of mechanism.

This invention is not limited to the improvement of resins made from metaphenylene diamine and glucose. It has been found that this process is equally advantageous when applied to resins formed from other saccharides and from other aromatic amines, as shown by the following examples.

*Example III.*—A metaphenylene diamine resin was produced as follows by using sucrose in place of glucose. Forty and eight-tenths parts of metaphenylene diamine were dissolved in a solution of 25.2 parts of concentrated hydrochloric acid in 500 parts of water. To this solution was added a solution of 105 parts of sucrose in 220 parts of water. The mixture was heated at about 100° C. for 1½ to 2 hours. It was then dried at 80° C. and the resulting resin gel was broken up and washed with hydrochloric acid and water. After regeneration with 14% ammonia solution and washing free of excess regenerant, this resin removed 0.46 milliequivalent of chloride ion per gram from a hydrochloric acid solution whose final chloride ion concentration was 8.6 milliequivalents per liter, and 1.65 milliequivalents of chloride ion per gram from a hydrochloric acid solution whose final chloride ion concentration was 36.5 milliequivalents per liter. When extrapolated to the comparison concentration of 4 milliequivalents per liter, this corresponded to a removal capacity of 0.23 milliequivalent per gram.

Fourteen parts of the above resin, before regeneration, were mixed intimately with 7 parts of anhydrous zinc chloride and placed in an autoclave together with about 22 parts of liquid ammonia. The autoclave was heated at 90° C. for 24 hours. After opening the autoclave and allowing the excess ammonia to evaporate, the resin was washed with hydrochloric acid and water and was regenerated with 14% ammonia solution. After washing free of excess regenerant, this resin removed 0.68 milliequivalent of chloride ion per gram from a hydrochloric acid solution whose final chloride ion concentration was 8.5 milliequivalents per liter, and 1.68 milliequivalents per gram from a hydrochloric acid solution whose final chloride ion concentration was 32 milliequivalents per liter. Extrapolated to the 4 milliequivalents per liter comparison concentration, the capacity of this aminated resin was 0.42 milliequivalent per gram; an increase of 82% in capacity over the starting resin.

*Example IV.*—Another amine-saccharide resin was produced by heating at reflux for two hours a mixture of 36 parts of glucose, 15 parts of aniline, 0.5 part of oxalic acid, and 12.5 parts of water. The resin gel which formed upon cooling was broken up and washed. After regeneration with 14% ammonia solution and washing free of excess regenerant, this resin removed 0.38 milliequivalent of chloride ion per gram from a hydrochloric acid solution whose final chloride ion concentration was 8.5 milliequivalents per liter, and 1.0 milliequivalent per gram from a hydrochloric acid solution whose final chloride ion concentration was 36.5 milliequivalents per liter. Extrapolated to the 4 milliequivalents per liter comparison concentration, this capacity corresponded to 0.23 milliequivalent per gram.

Twenty parts of this aniline-glucose resin were mixed intimately with 9.6 parts of anhydrous zinc chloride and placed in an autoclave with about 22 parts of liquid ammonia. The autoclave was heated at 90° C. for 24 hours. After boiling off excess ammonia and washing, the product was regenerated with 14% ammonia solution and was washed free of excess regenerant. The resin removed 0.77 milliequivalent of chloride ion per gram from a hydrochloric acid solution whose final chloride ion concentration was 8.3 milliequivalents per liter, and 1.75 milliequivalents per gram from a hydrochloric acid solution whose final chloride ion concentration was 34.5 milliequivalents per liter. The comparison capacity at 4 milliequivalents per liter was 0.50 milliequivalent per gram; an increase of 117% resulting from the amination treatment.

Treatment according to this invention is also applicable to resins prepared from other aromatic amines, such as the toluidines, 5-alkyl metaphenylene diamines, ortho phenylene diamines, and paraphenylene diamines, and to resins prepared from other saccharides or from substances capable of yielding saccharides upon hydrolysis, such as starch and cellulose.

The beneficial effects of this invention are not limited by the conditions described in the above examples, but are obtained over a wide range of operating conditions. Other proportions of reactants and other conditions such as the time and temperature of heating may be varied as will be apparent to those skilled in the art.

The amination treatment may also be applied to the resin in the regenerated (base) condition, although it is less effective under these conditions. For example, a sample of the resin described in Example III was regenerated with 14% ammonia solution, washed free of excess regenerant and dried. The regenerated resin was then treated with zinc chloride and ammonia under the conditions described in Example III. The aminated resin, after washing and regeneration, absorbed 0.26 milliequivalent of chloride ion per gram at the 4 milliequivalents per liter comparison concentration. This corresponded to a capacity increase of 13%, in contrast to 74% increase obtained by aminating the resin as the hydrochloride.

This invention may also be carried out by treatment of aromatic amine-saccharide resins with zinc chloride and amines, especially primary and secondary aliphatic amines. Anhydrous ammonia may also be replaced by solutions of ammonia in various solvents, such as alcohols, dioxane, and even water. The resin may be heated with the so-called zinc chloride ammonia ($ZnCl_2.2NH_3$) in the presence or absence of additional ammonia. The zinc chloride may also be replaced by certain other materials capable of acting as catalysts in this reaction. Among these compounds may be mentioned aluminum chloride, ferric chloride, boron trifluoride, titanium tetrachloride, and nickel chloride. A common characteristic of all of these halides is their capability of hydrolyzing in water to give an acid reaction.

The resins produced by this reaction are applicable in the usual anion exchange and acid removal processes. For example, the resin granules may be employed in the form of a bed contained in a vessel equipped with a suitably valved inlet and outlet. The resin is regenerated by passing through the bed a solution of an alkali such as ammonia, sodium hydroxide, sodium carbonate, sodium bicarbonate, or mixtures of these. After suitably rinsing, an acid solution, such as the effluent from an acid-regenerated cation exchanger, may be passed through the bed of anion exchanger, either upflow or downflow. The flow of acid solution is stopped when the anion exchanger is saturated and permits acid to escape in the effluent. The bed may then be backwashed and regenerated as described above. This regenerative or cyclic process may be repeated over and over.

By the term "anion exchanger" as used herein is meant a substance substantially insoluble in dilute aqueous solutions of acids or bases that has the ability to remove acids from solutions, and that can be regenerated with a basic solution to restore its acid removing ability.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A process of preparing an improved anion exchanger comprising heating an anion exchanging aromatic primary amine-saccharide resin, insoluble in dilute aqueous solutions of acids and bases, with ammonia and a halide capable of hydrolyzing in water to give an acid reaction as a catalyst to increase the capacity of the resin for removing acids from liquids.

2. A process of preparing an improved anion exchanger comprising contacting an aromatic primary amine-saccharide resin, insoluble in dilute aqueous solutions of acids and bases, with an acid, and heating said resin in the acidified condition with ammonia under substantially anhydrous conditions and in the presence of a halide capable of hydrolyzing in water to give an acid reaction to increase the nitrogen content of the resin by introducting amine groups therein.

3. A process of preparing an improved anion exchanger comprising heating an aromatic primary amine-saccharide resin, insoluble in dilute aqueous solutions of acids and bases, with ammonia and zinc chloride to increase the capacity of the resins for removing acids from liquids.

4. A process of preparing an improved anion exchanger comprising heating a metaphenylene diamine-glucose resin, insoluble in dilute aqueous solutions of acids and bases, with ammonia and a halide catalyst capable of hydrolyzing in water to give an acid reaction.

5. A process of preparing an improved anion exchanger comprising heating a metaphenylene diamine-sucrose resin, insoluble in dilute aqueous solutions of acids and bases, with ammonia and a halide catalyst capable of hydrolyzing in water to give an acid reaction.

6. A process of preparing an improved anion exchanger comprising heating an aniline-glucose resin, insoluble in dilute aqueous solutions of acids and bases, with ammonia and a halide catalyst capable of hydrolyzing in water to give an acid reaction.

7. An improved anion exchanger, insoluble in dilute aqueous solutions of acids or bases, which comprises an aromatic primary amine-saccharide resin that has been aminated by heating with a halide catalyst capable of hydrolyzing in water to give an acid reaction and ammonia to increase substantially its capacity for removing acids from solutions.

8. An improved anion exchanger, insoluble in dilute aqueous solutions of acids and bases, comprising an aromatic primary amine-saccharide resin that has been aminated to increase its acid removal capacity by heating with ammonia and zinc chloride.

9. An improved anion exchanger, insoluble in dilute aqueous solutions of acids and bases, comprising an aromatic primary amine-saccharide resin that has been aminated to increase its acid removing capacity by heating said resin in an acidified condition with ammonia and a halide catalyst capable of hydrolyzing in water to give an acid reaction.

10. An improved anion exchanger, insoluble in dilute aqueous solution of acids and bases, comprising a metaphenylene diamine-glucose resin that has been animated by heating with ammonia and a halide catalyst capable of hydrolyzing in water to give an acid reaction.

11. An improved anion exchanger insoluble in dilute aqueous solutions of acids and bases, comprising a metaphenylene diamine-succrose resin that has been aminated by heating with ammonia and a halide catalyst capable of hydrolyzing in water to give an acid reaction.

12. An improved anion exchanger, insoluble in dilute aqueous solutions of acids and bases, comprising an aniline-glucose resin that has been aminated by heating with ammonia and a halide catalyst capable of hydrolyzing in water to give an acid reaction.

13. A process of removing acids from liquids comprising contacting such a liquid with an anion exchanger, insoluble in dilute aqueous solutions of acids and bases, in granular form consisting essentially of aromatic primary amine-saccharide resin which has been aminated by ammonia in the presence of a halide catalyst capable of hydrolyzing in water to give an acid reaction and separating the exchanger from the liquid.

14. A cyclic process of removing acids from water comprising passing such water through a bed of granular anion exchanger, insoluble in dilute aqueous solutions of acids and bases, and consisting essentially of aromatic primary amine-saccharide resin which has been aminated with ammonia in the presence of a halide catalyst capable of hydrolyzing in water to give an acid reaction and, when the ability of said bed to remove acids becomes depleted, regenerating said bed by treatment with an alkaline solution.

SIDNEY SUSSMAN.